(12) United States Patent
Sato et al.

(10) Patent No.: US 6,843,756 B2
(45) Date of Patent: Jan. 18, 2005

(54) DOWNSHIFT CONTROL APPARATUS OF VEHICULAR AUTOMATIC TRANSMISSION, AND CONTROL METHOD THEREOF

(75) Inventors: Toshimitsu Sato, Toyota (JP); Hisanori Nomoto, Nisshin (JP); Naoyuki Sakamoto, Toyota (JP); Toshio Sugimura, Nagoya (JP); Hiromichi Kimura, Okazaki (JP); Yoshiharu Harada, Toyota (JP); Noboru Shibata, Anjo (JP)

(73) Assignees: Toyota Jidosha Kabushiki Kaisha, Toyota (JP); Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 10/639,621

(22) Filed: Aug. 13, 2003

(65) Prior Publication Data

US 2004/0043867 A1 Mar. 4, 2004

(30) Foreign Application Priority Data

Aug. 30, 2002 (JP) ........................................ 2002-253138

(51) Int. Cl.$^7$ ............................................... F16H 61/06
(52) U.S. Cl. ...................... 477/144; 477/107; 477/110; 477/148; 477/149; 701/64; 701/66
(58) Field of Search ................................ 477/107, 110, 477/144, 148, 149; 701/64, 66

(56) References Cited

U.S. PATENT DOCUMENTS 5,583,768 A * 12/1996 Hamajima et al. ............ 701/53
5,624,351 A * 4/1997 Fujita et al. ................. 477/148
6,264,580 B1 * 7/2001 Tabata et al. ................ 477/149
6,368,249 B1 * 4/2002 Hubbard ...................... 477/121
6,648,796 B2 * 11/2003 Yeo ............................. 477/64
6,736,757 B2 * 5/2004 Kubo et al. .................. 477/144

FOREIGN PATENT DOCUMENTS

JP          9-229176 A      9/1997

* cited by examiner

*Primary Examiner*—Charles A. Marmor
*Assistant Examiner*—David D. Le
(74) *Attorney, Agent, or Firm*—Oblon, Spivak, McClelland, Maier & Neustadt, P.C.

(57) ABSTRACT

In a vehicle in which a moderate throttle opening degree control of maintaining a degree of throttle opening that is less than a degree of throttle opening that corresponds to an accelerator operation is performed for a predetermined period following a beginning of the accelerator operation, if it is determined that a clutch-to-clutch downshift judgment has been made, the reduction of the engaging pressure of a disengage-side friction engagement device is restrained until it is determined that the moderate throttle opening degree control has ended. Therefore, even if the turbine torque is returned to a normal value at the end of the moderate throttle opening degree control, insufficient engaging torque is avoided, and the takeover of engaging torque for the clutch-to-clutch downshift is smoothly performed while the turbine torque is stable. Hence, occurrence of a shock related to the end of the moderate throttle opening degree control is suitably prevented.

14 Claims, 9 Drawing Sheets

FIG. 2

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N, P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

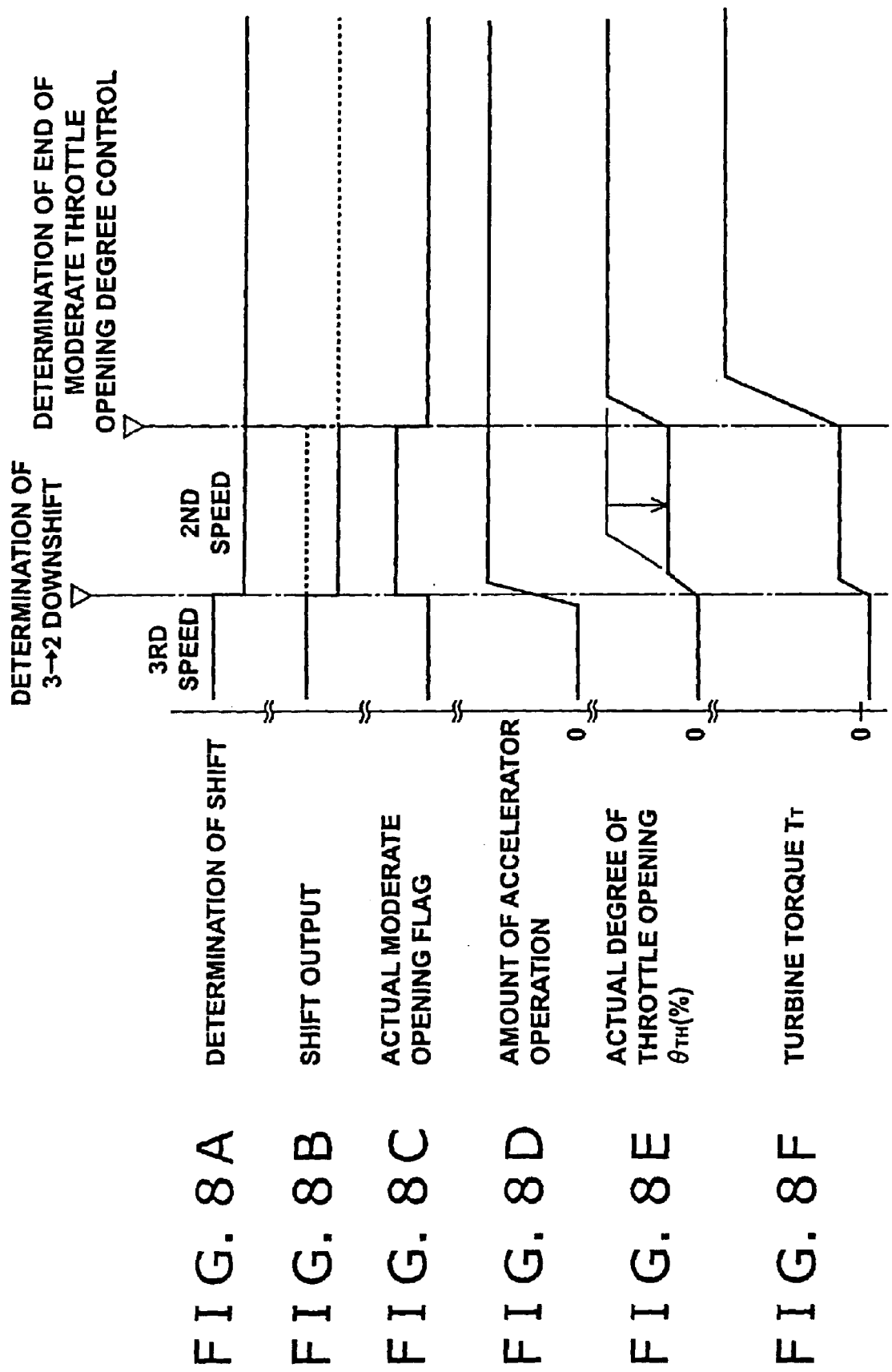

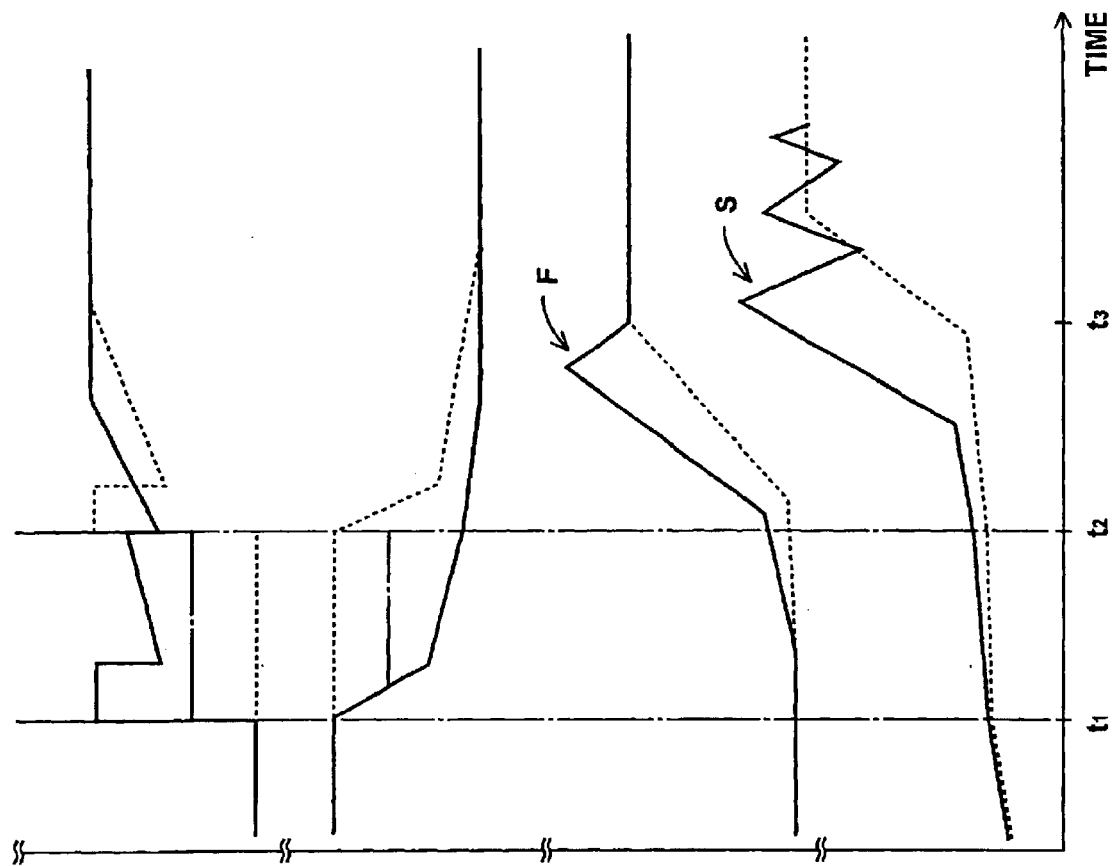

DOWNSHIFT CONTROL APPARATUS OF VEHICULAR AUTOMATIC TRANSMISSION, AND CONTROL METHOD THEREOF

INCORPORATION BY REFERENCE

The disclosure of Japanese Patent Application No. 2002-253138 filed on Aug. 30, 2002 including the specification, drawings and abstract is incorporated herein by reference in its entirety.

BACKGROUND OF THE INVENTION

1. Field of the Invention

The invention relates to a downshift control apparatus of a vehicular automatic transmission and a control method thereof for suitably preventing occurrence of a shock caused by a downshift performed during an accelerating operation of a vehicle.

2. Description of the Related Art

For example, Japanese Patent Application Laid-open No. 9-229176 proposes a shift control apparatus that operates as described below at the time of a downshift, for example, a clutch-to-clutch downshift in which the engaging pressure of a disengage-side hydraulic friction engagement device is reduced and the engaging pressure of an engage-side hydraulic friction engagement device is temporarily raised. The shift control apparatus determines whether the present downshift is a downshift that requires a temporary increase in the engine rotation speed in order to realize an equal-speed downshift. The apparatus changes the content of the control of increasing the engaging pressure of the engage-side hydraulic friction engagement device between the case of a downshift that requires an increase in the engine rotation speed and the case of a downshift that does not require an increase in the engine rotation speed. Therefore, the engaging pressure of the hydraulic friction engagement devices that affects the tendency of change in the input shaft rotation speed of the automatic transmission is controlled in accordance with the control of the engine rotation speed. Hence, the torsional oscillation of the power train during an end-of-shift period decreases, and the shock caused by a shift is reduced.

In some vehicles, a moderate throttle opening degree control for maintaining a degree of throttle opening that is less than the degree of throttle opening corresponding to an accelerator pedal operation for a predetermined period following the beginning of the accelerator pedal operation, is performed in order to mitigate the acceleration shock to the vehicle. In such a vehicle, during a predetermined period in an accelerating operation, the degree of throttle opening is restricted so that the torque input to the automatic transmission is reduced. Therefore, the engaging pressure of an engage-side hydraulic friction engagement device or the engaging pressure of a disengage-side hydraulic friction engagement device controlled (set) corresponding to the torque input to the automatic transmission is reduced. Hence, when the degree of throttle opening is set at a value corresponding to the amount of accelerator operation simultaneously with the end of the moderate throttle opening degree control, there is a danger of insufficient engagement torque of the hydraulic friction engagement devices, which may impede smooth takeover of engagement torque during the clutch-to-clutch downshift, and therefore may cause a shock.

SUMMARY OF THE INVENTION

The invention has been accomplished in view of the aforementioned circumstances. It is an object of the invention to provide a downshift control apparatus of a vehicular automatic transmission which suitably prevents the occurrence of a shock related to the end of the moderate throttle opening degree control, and to provide a downshift control method.

In order to achieve the aforementioned and other objects, in a downshift control apparatus and a method thereof according to an aspect of the invention, a moderate throttle opening degree control of maintaining a degree of throttle opening that is less than a degree of throttle opening that corresponds to an accelerator operation is performed for a predetermined period following a start of the accelerator operation, and a downshift is performed by reducing the engaging pressure of a disengage-side friction engagement device. In the control apparatus and method, (a) it is judged whether the downshift is to be performed, and (b) it is determined whether the moderate throttle opening degree control has ended, and (c) if it is judged that the downshift is to be performed, a reduction of the engaging pressure of the disengage-side friction engagement device is restrained until it is determined that the moderate throttle opening degree control has ended.

According to the above-described aspect of the invention, if it is judged that the downshift is to be performed, the reduction of the engaging pressure of the disengage-side friction engagement device is restrained until it is determined that the moderate throttle opening degree control has ended. Therefore, even if the turbine torque is returned to a normal value at the end of the moderate throttle opening degree control, insufficient engaging torque is avoided, and the takeover of engaging torque for the downshift is smoothly performed while the turbine torque is stable. Hence, occurrence of a shock related to the end of the moderate throttle opening degree control is suitably prevented.

In a preferred form of the invention, the engaging pressure of the disengage-side friction engagement device may be restrained by delaying a start of the reduction of the engaging pressure of the disengage-side friction engagement device. Therefore, since the reduction of the engaging pressure of the disengage-side friction engagement device is restrained by delaying the start of the reduction of the engaging pressure of the disengage-side friction engagement device until it is determined that the moderate throttle opening degree control has ended, insufficient engaging torque of the disengage-side friction engagement device does not occur at the end of the moderate throttle opening degree control, and therefore occurrence of a shock is suitably prevented.

In another preferred form, the engaging pressure of the disengage-side friction engagement device may be directly controlled by an output pressure of a linear solenoid valve. If it is determined that the moderate throttle opening degree control has ended, a signal that controls the linear solenoid valve may be temporarily changed such as to rapidly discharge an operating oil from the disengage-side friction engagement device, and then may be changed so as to slowly discharge the operating oil from the disengage-side friction engagement device. Therefore, the engaging pressure of the disengage-side friction engagement device controlled directly by the output pressure of the linear solenoid valve is controlled without a response delay.

In still another preferred form, the engaging pressure of the disengage-side friction engagement device that is reduced during the downshift may be set in accordance with an input torque of the automatic transmission, and may be corrected in accordance with a change in an engine rotation speed or a change in an output shaft torque. Therefore, an appropriate engaging pressure corresponding to the input torque of the automatic transmission is obtained, and the engaging pressure is corrected so as to prevent engine racing, that is, a temporary rapid rise of the engine rotation speed, and a tie-up, that is, a temporary rapid fall of the output shaft torque.

Furthermore, in a preferred form, the reduction of the engaging pressure of the disengage-side friction engagement device may be restrained by holding the engaging pressure of the disengage-side friction engagement device at a pressure that is lower than a preset maximum value and that does not start a disengagement of the disengage-side friction engagement device. Therefore, since the reduction of the engaging pressure of the disengage-side friction engagement device is restrained by holding the engaging pressure of the disengage-side friction engagement device at a pressure that is lower than the preset maximum value and that does not start the disengagement of the disengage-side friction engagement device, insufficient engaging torque of the disengage-side friction engagement device does not occur at the end of the moderate throttle opening degree control, and occurrence of a shock is suitably prevented. In addition, the responsiveness of the change in the engaging pressure of the disengage-side friction engagement device following the end of the moderate throttle opening degree control can be improved.

Still further, in a preferred form, whether or not to perform the downshift may be judged when an accelerator pedal is depressed. Therefore, a power-on downshift judgment during an accelerating state where the accelerator pedal is depressed is determined, so that the occurrence of a shock at the time of the power-on downshift will be suitably prevented.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a table indicating the states of engagement and disengagement of clutches and brakes for establishing various gear stages of the automatic transmission shown in FIG. 1;

FIGS. 8A to 8J are time charts illustrating a portion of the control operations of the electronic control unit indicated in FIG. 3, that is, a control operation of restraining the reduction of the engaging pressure of a disengage-side friction engagement device at the time of a clutch-to-clutch downshift, wherein FIG. 8A indicates the presence and absence of a shift judgment, and FIG. 8B indicates a shift output, and FIG. 8C indicates the presence and absence of an actual opening degree flag, and FIG. 8D indicates the accelerator operation amount, and FIG. 8E indicates the degree of throttle opening $\theta_{TH}$, and FIG. 8F indicates the turbine torque $T_T$, and FIG. 8G indicates the drain-side engaging pressure instruction value (instruction signal to a linear solenoid valve SL2), and FIG. 8H indicates the engaging pressure $P_{CO}$ of a clutch C0, and FIG. 8I indicates the engine rotation speed $N_E$, and FIG. 8J indicates the engine output shaft torque $T_{OUT}$.

DETAILED DESCRIPTION OF THE PREFERRED EMBODIMENTS

A preferred embodiment of the invention will be described hereinafter with reference to the accompanying drawings.

Figure 1:
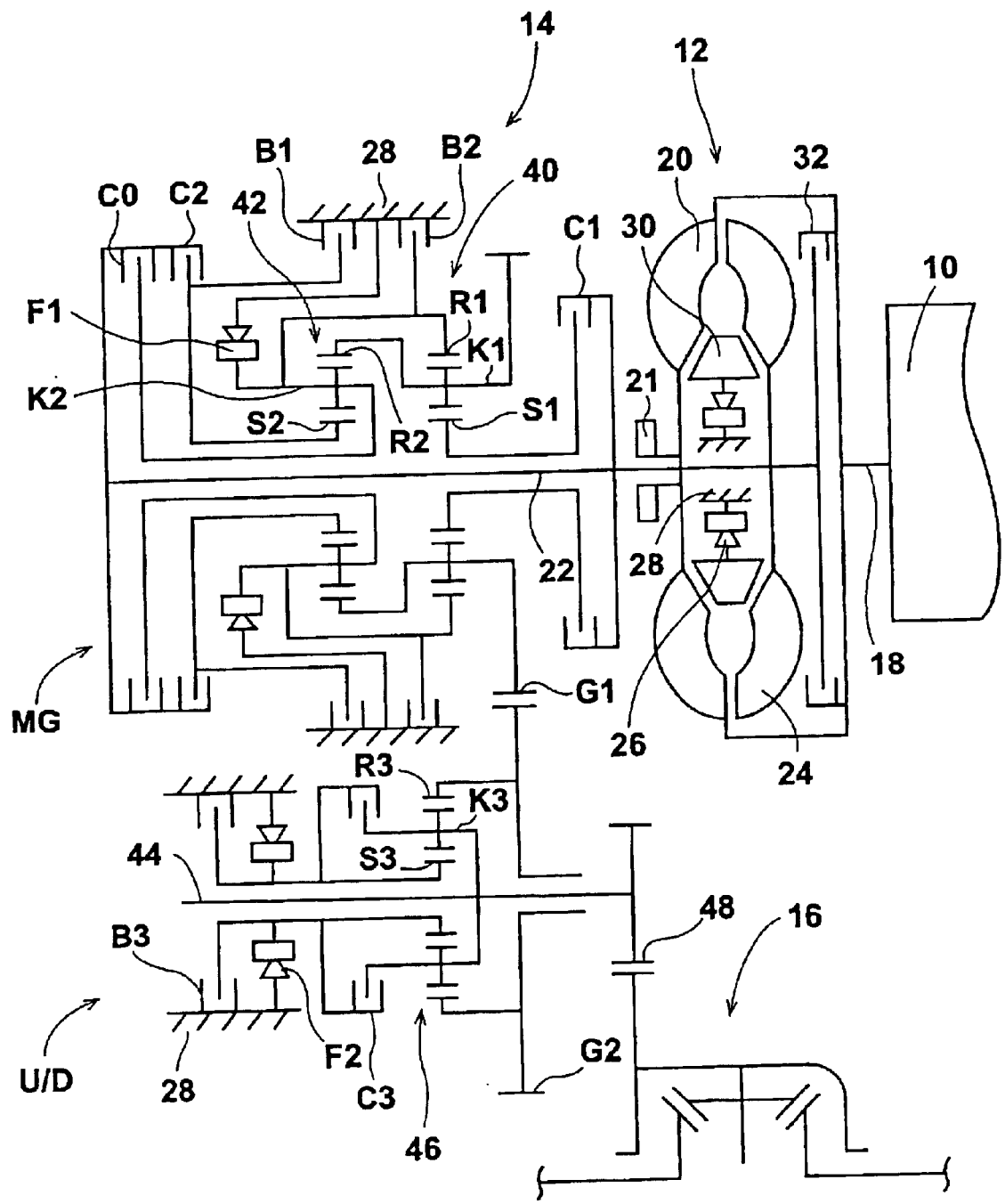
FIG. 1 is a skeleton diagram illustrating the construction of a vehicular drive apparatus to which a downshift control apparatus of an automatic transmission in accordance with the invention is applied.

FIG. 1 is a skeleton diagram of a transverse type vehicular drive apparatus of an FF (front-engine front-drive) vehicle or the like. The vehicular drive apparatus is designed so that the output of an engine 10 formed by an internal combustion engine, such as a gasoline engine or the like, is transferred to vehicle drive wheels (front wheels (not shown)) via a drive power transfer apparatus, including a torque converter 12, an automatic transmission 14, a differential gear device 16, etc. The torque converter 12 includes a pump impellor 20 connected to a crankshaft 18 of the engine 10, a turbine runner 24 connected to an input shaft 22 of the automatic transmission 14, a stator 30 fixed to a housing 28 (a non-rotational member) via a one-way clutch 26, and a lockup clutch 32 for directly coupling the crankshaft 18 to the input shaft 22 via a damper (not shown). A mechanical oil pump 21, such as a gear pump or the like, is connected to the pump impellor 20 so that the oil pump 21 is driven and rotated together with the pump impellor 20 by the engine 10 to generate oil pressure for the purpose of gear-shifting, lubrication, etc. The engine 10 is a drive power source for running the vehicle. The torque converter 12 is a fluid coupling.

The automatic transmission 14 includes a pair of a first planetary gear device 40 and a second planetary gear device 42 of a single pinion-type that are disposed coaxially on the input shaft 22 and that form a generally-termed CR-CR coupled planetary gear mechanism in which the carriers and the ring gears of the two devices are connected to each other, a third planetary gear device 46 whose members are coaxially disposed on a counter shaft 44 extending parallel with the input shaft 22, and an output gear 48 fixed to an end of the counter shaft 44 and meshing with the differential gear device 16. Components of the planetary gar devices 40, 42, 46, that is, sun gears, ring gears, and carriers that rotatably support planetary gears meshing with the sun gears and the ring gears, are selectively interconnected by four clutches C0, C1, C2, C3, or are selectively connected to the housing 28 (non-rotational member) by three brakes B1, B2, B3. Furthermore, the gear components are engaged with one another or with the housing by two one-way clutches F1, F2, depending on the rotational direction. It is to be noted herein that the differential gear device 16 is symmetric about an axis (axle), and therefore a lower half of the differential gear device 16 is omitted from the illustration in FIG. 3.

The first planetary gear device 40, the second planetary gear device 42, the clutches C0, C1, C2, the brakes B1, B2 and the one-way clutch F1 disposed coaxially on the input shaft 22 form a main speed change section MG of four forward speeds and one reverse speed. The planetary gear device 46, the clutch C3, the brake B3 and the one-way clutch F2 disposed on the counter shaft 44 form a subsidiary speed change section, that is, an under-drive section U/D. In the main speed change section MG, the input shaft 22 is connected to the carrier K2 of the second planetary gear device 42, the sun gear S1 of the first planetary gear device 40, and the sun gear S2 of the second planetary gear device 42 via the clutches C0, C1, C2, respectively. The ring gear R1 of the first planetary gear device 40 is firmly or integrally connected to the carrier K2 of the second planetary gear device 42. The ring gear R2 of the second planetary gear device 42 is firmly or integrally connected to the carrier K1 of the first planetary gear device 40. The sun gear S2 of the second planetary gear device 42 is connected to the housing 28 (non-rotational member) via the brake B1. The ring gear R1 of the first planetary gear device 40 is connected to the housing 28 (non-rotational member) via the brake B2. The one-way clutch F1 is provided between the carrier K2 of the second planetary gear device 42 and the housing 28 (non-rotational member). A first counter gear G1 fixed to the carrier K1 of the first planetary gear device 40 and a second counter gear G2 fixed to the ring gear R3 of the third planetary gear device 46 mesh with each other. In the under-drive section U/D, the sun gear S3 and the carrier K3 of the third planetary gear device 46 are interconnected via the clutch C3. The brake B3 and the one-way clutch F2 are disposed in parallel between the sun gear S3 and the housing 28 (non-rotational member).

The clutches C0, C1, C2, C3 and the brakes B1, B2, B3 (hereinafter, simply referred to as "clutches C" and "brakes B" if not particularly distinguished) are hydraulic friction engagement devices, for example, multi-plate clutches, band brakes, etc., which are engaged and controlled by hydraulic actuators. The clutches C0, C1, C2, C3 and the brakes B1, B2, B3 are selectively engaged and disengaged, for example, as indicated in FIG. 2, through changes in a hydraulic circuit caused by operation of a manual valve (not shown) and energization and de-energization of solenoids S1 to S5 and linear solenoids SL1, SL2, SLU of an oil pressure control circuit 98 (see FIG. 3). Therefore, various gear stages, that is, five forward gear speed stages, one reverse gear speed stage and a neutral gear stage, can be realized in accordance with the operating position of a shift lever 72 (see FIG. 3). In FIG. 2, "1st" to "5th" indicate the first to fifth forward gear speeds, and "○" indicates engagement, and "x" indicates disengagement, and "Δ" indicates the engagement caused only at the time of driving. The shift lever 72 is designed so as to be operated in accordance with, for example, a shift pattern as indicated in FIG. 4, that is, operated to a parking position "P", a reverse drive position "R", a neutral position "N", a forward drive position "D", "4", "3", "2", "L". At the positions "P" and "N", the neutral gear stage is established as a non-drive gear stage that discontinues the power transfer. At the position "P", rotation of the drive wheels is mechanically prevented by a mechanical parking mechanism (not shown). The gear stages of five forward speeds and one reverse speed established when the shift lever 72 is at a forward drive position, such as the position "D" or the like, or the position "R", correspond to drive gear stages. Furthermore, the shift between the second gear speed and the third gear speed is a clutch-to-clutch shift accomplished by simultaneously causing the engagement or disengagement of the clutch C0 and the disengagement or engagement of the brake B1 as indicated in FIG. 2. Similarly, the shift between the third gear speed and the fourth gear speed is a clutch-to-clutch shift accomplished by simultaneously causing the engagement or disengagement of the clutch C1 and the disengagement or engagement of the brake B1. The engaging pressure $P_{C0}$ of the clutch C0 is directly controlled by the output pressure of the linear solenoid SL2. The aforementioned hydraulic friction engagement devices use, as an original pressure, the line pressure that is adjusted in accordance with the turbine torque $T_T$, that is, the input torque $T_{IN}$ of the automatic transmission 14, or the degree of throttle opening $\theta_{TH}$, which serves as a substitute value for the input torque $T_{IN}$.

Figure 3:
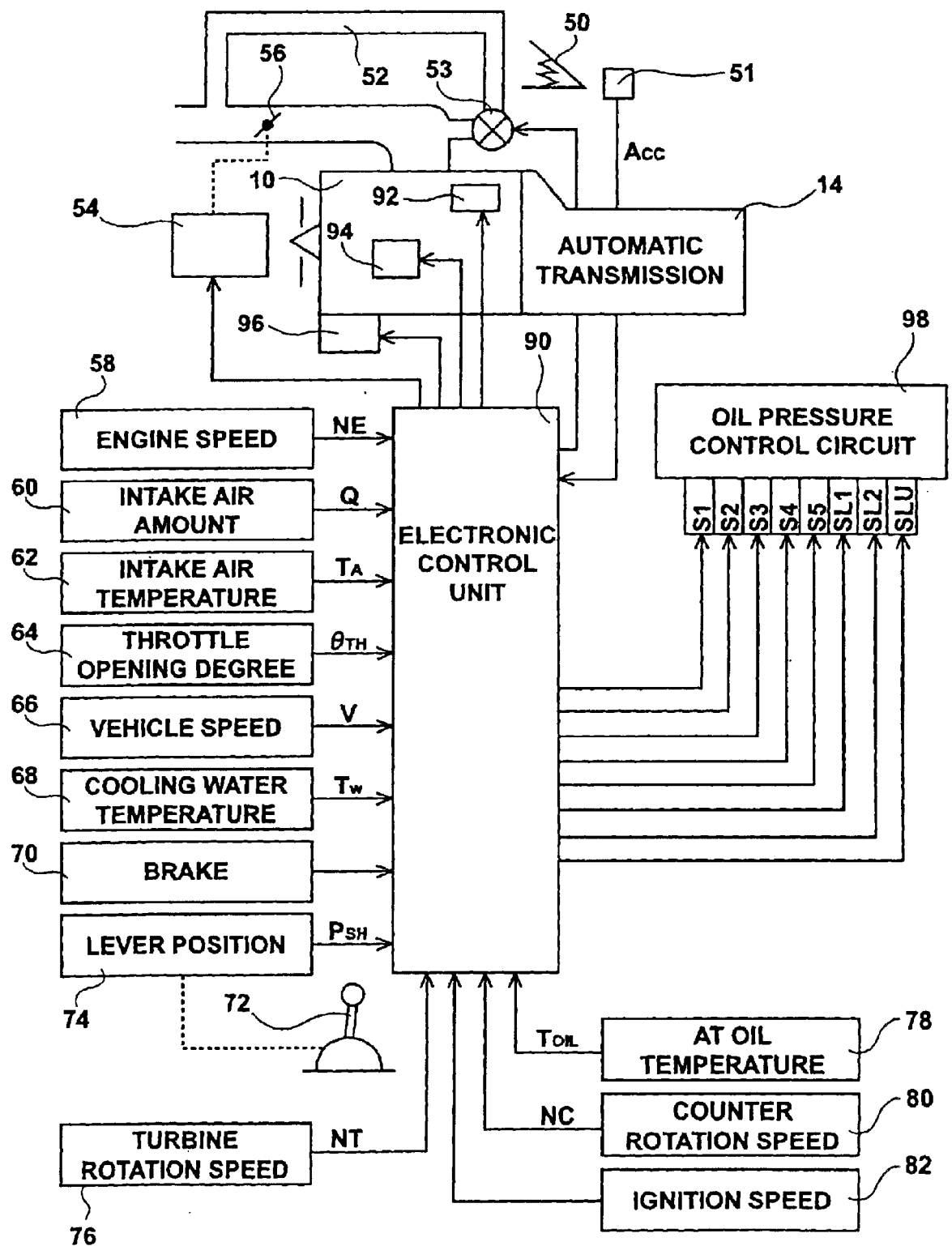
FIG. 3 is a block diagram illustrating a control system that performs an engine control and a shift control of the vehicular drive apparatus shown in FIG. 1.
Figure 4:
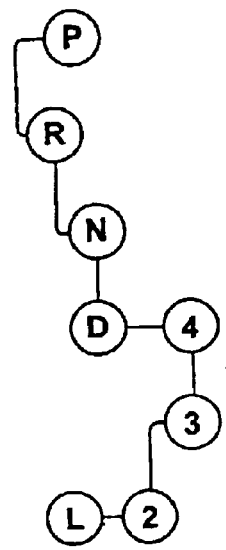
FIG. 4 is a diagram showing a shift pattern of a shift lever indicated in FIG. 3.
Figure 5:
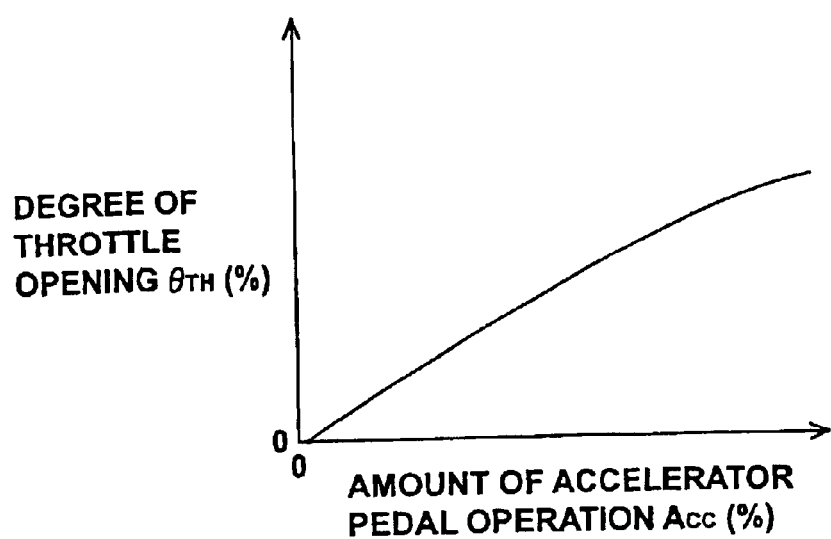
FIG. 5 is a graph indicating a relationship between the amount of accelerator pedal operation Acc and the degree of throttle opening $\theta_{TH}$ which is used in a throttle control performed by an electronic control unit indicated in FIG. 3.

FIG. 3 is a block diagram illustrating a control system provided in a vehicle for controlling, for example, the engine 10 and the automatic transmission 14 shown in FIG. 1. In this control system, the amount of operation of an accelerator pedal 50 (amount of accelerator operation) Acc is detected by an accelerator operation amount sensor 51. The accelerator pedal 50 is depressed in accordance with the amount of output requested by a driver, and corresponds to an accelerator operating member. The amount of accelerator pedal operation Acc corresponds to a requested output amount. An intake pipe of the engine 10 is provided with an electronic throttle valve 56 whose opening is changed by a throttle actuator 54 so as to reach the angle of opening (degree of opening) $\theta_{TH}$ (%) determined on the basis of the amount of accelerator pedal operation Acc in accordance with a relationship pre-stored (preset) as indicated in FIG. 5. This relationship is set so that the degree of throttle opening $\theta_{TH}$ increases as the amount of accelerator pedal operation Acc increases. A bypass 52 extending around the electronic throttle valve 56 for the purpose of an idle speed control is provided with an ISC (idle speed control) valve 53 for controlling the amount of intake air at the time of complete closure of the electronic throttle valve 56 in order to control the idle speed $N_{EIDL}$ of the engine 10. Further provided are an engine speed sensor 58 for detecting the rotation speed NE of the engine 10, an intake air amount sensor 60 for detecting the amount of intake air Q of the engine 10, an intake air temperature sensor 62 for detecting the temperature TA of intake air, an idle switch-equipped throttle sensor 64 for detecting a completely closed state of the electronic throttle valve 56 (idle state) and the degree of opening $\theta_{TH}$ of the electronic throttle valve 56, a vehicle speed sensor 66 for detecting the rotation speed $N_{OUT}$ of the counter shaft 44 corresponding to the vehicle speed V, a cooling water temperature sensor 68 for detecting the temperature Tw of cooling water of the engine 10, a brake switch 70 for detecting the presence and absence of a foot brake operation, a lever position sensor 74 for detecting the lever position (operating position) $P_{SH}$ of the shift lever 72, a turbine rotation speed sensor 76 for detecting the turbine rotation speed NT (=rotation speed $N_{IN}$ of the input shaft 22), an AT oil temperature sensor 78 for detecting the AT oil temperature $T_{OIL}$, that is, the temperature of the operating oil in the oil pressure control circuit 98, a counter rotation speed sensor 80 for detecting the rotation speed NC of the first counter gear G1, an ignition switch 82, etc. These sensors supply an electronic control unit 90 with signals indicating the engine rotation speed NE, the amount of intake air Q, the intake air temperature TA, the degree of throttle valve opening $\theta_{TH}$, the vehicle speed V, the engine cooling water temperature Tw, the presence or absence of brake operation, the lever position $P_{SH}$ of the shift lever 72, the turbine rotation speed NT, the AT oil temperature $T_{OIL}$, the counter rotation speed NC, the operating position of the ignition switch 82, etc. The brake switch 70 is an on-off switch that changes between an on-state and an off-state depending on the state of depression of a brake pedal for operating a normal brake device.

The electronic control unit 90 is formed by a so-called microcomputer that includes a CPU, a RAM, a ROM, input-output interfaces, etc. The CPU executes an output control of the engine 10, a shift control of the automatic transmission 14, etc., by processing signals in accordance with programs pre-stored in the ROM while using a temporary storage function of the RAM. The electronic control unit 90 may be provided separately as an engine control unit and a shift control unit if necessary. As for the output control of the engine 10, the opening and closing of the electronic throttle valve 56 is controlled by the throttle actuator 54, and a fuel injection valve 92 is controlled for controlling the amount of fuel injection, and an ignition device 94, such as an igniter or the like, is controlled for an ignition timing control, and the ISC valve 53 is controlled for an idle speed control. As for the control of the electronic throttle valve 56, for example, the throttle actuator 54 is driven on the basis of the actual amount of accelerator pedal operation Acc in accordance with the relationship indicated in FIG. 5, in such a manner as to increase the degree of throttle opening $\theta_{TH}$ with increases in the amount of accelerator pedal operation Acc. At the time of startup of the engine 10, a starter (electric motor) 96 is used to crank the crankshaft 18.

Figure 6:
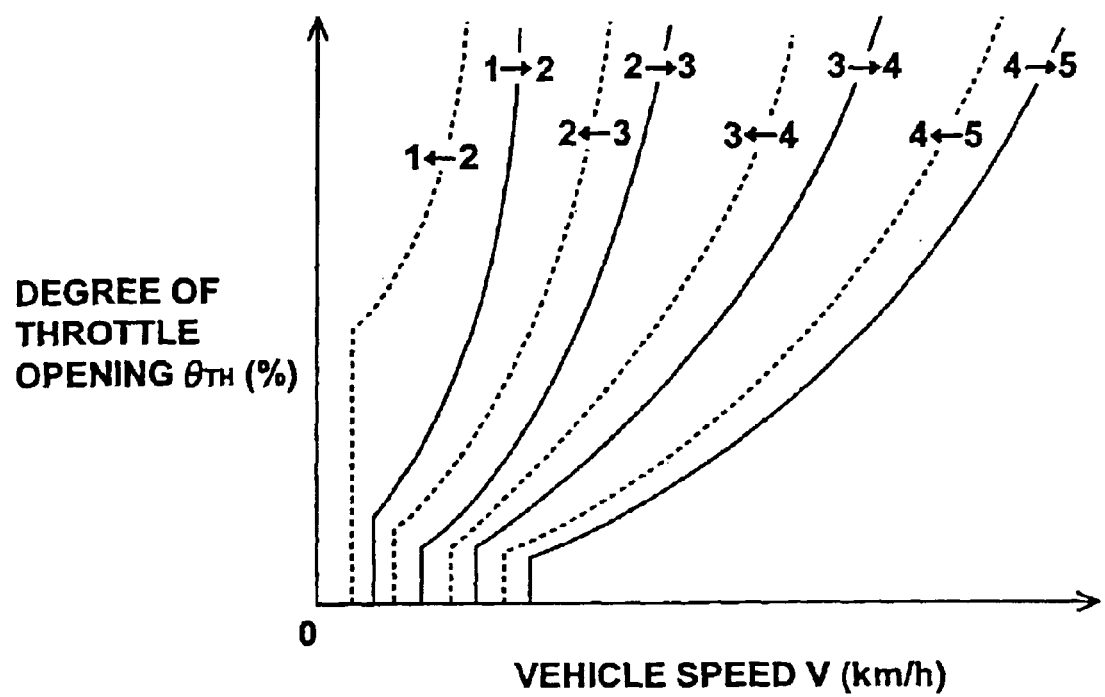
FIG. 6 is a graph indicating a shift map used in a shift control of the automatic transmission performed by the electronic control unit indicated in FIG. 3.
Figure 7:
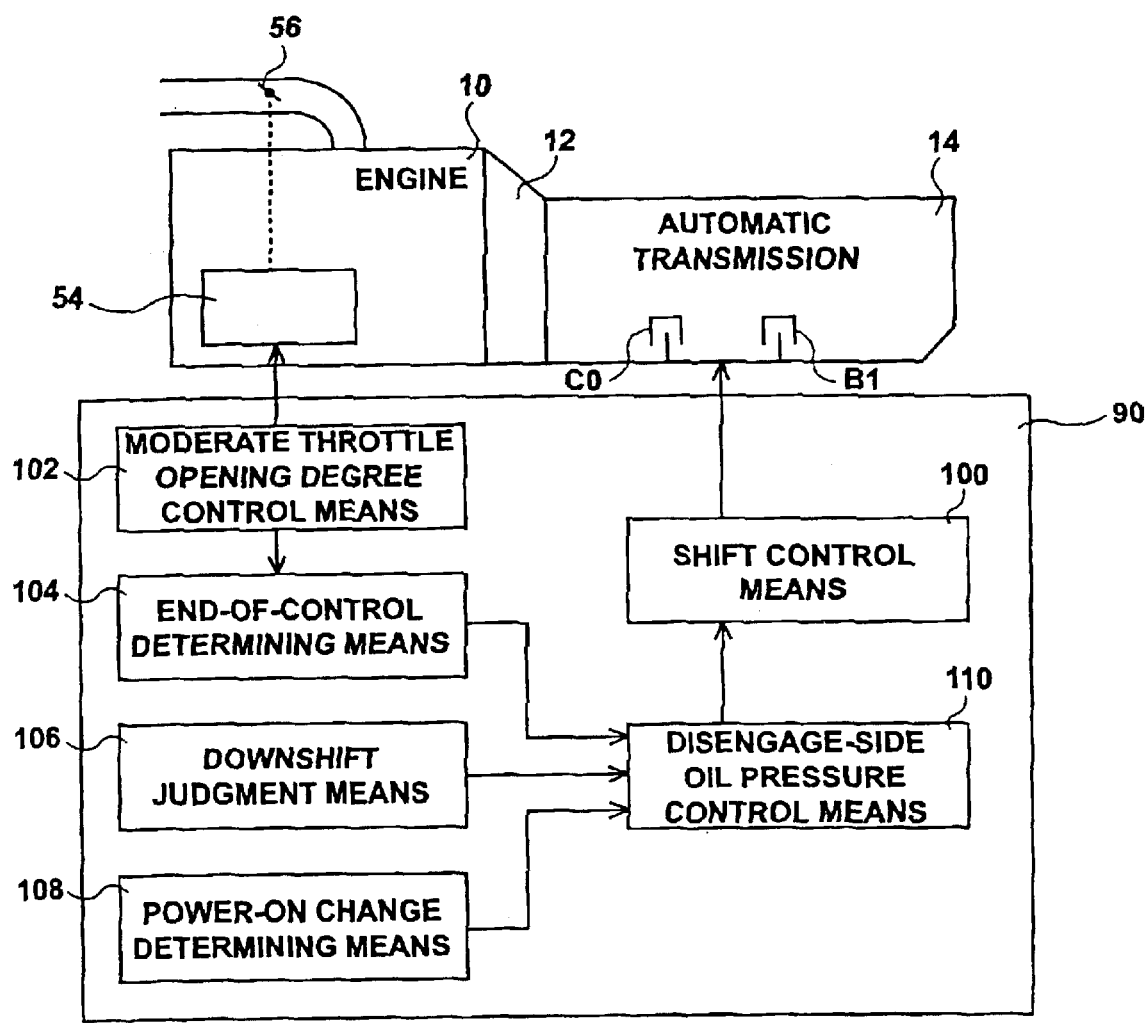
FIG. 7 is a function block diagram illustrating a portion of the control functions of the electronic control unit indicated in FIG. 3, that is, a control function of restraining the reduction of the engaging pressure of a disengage-side friction engagement device at the time of a downshift.

FIG. 7 is a block diagram illustrating a portion of the control functions of the electronic control unit 90, that is, a control function of restraining the engaging pressure of a disengage-side hydraulic friction engagement device at the time of a power-on downshift. Referring to FIG. 7, a shift control means 100 determines a gear speed of the automatic transmission 14 to be selected, on the basis of the actual degree of throttle opening $\theta_{TH}$ and the vehicle speed V with reference to a pre-stored shift diagram (shift map), for example, a map indicated in FIG. 6, that is, executes judgment of a shift from the present gear stage to a post-shift gear stage. Then, the shift control means 100 executes shift output for starting the shift operation to the determined gear stage, and also performs an operation of changing the on-state (energization) and the off-state (de-energization) of the solenoids S1 to S5 of the oil pressure control circuit 98, an operation of continuously changing the state of energization of the linear solenoids SL1, SL2, SLU through a duty control and the like, etc., in order to prevent occurrence of a shift shock, such as a change in drive power or the like, and degradation of the durability of friction members. In FIG. 6, solid lines are upshift lines, and broken lines are downshift lines. As indicated in FIG. 6, the gear stage is changed to a lower-speed gear stage having a greater speed ratio (=input rotation speed $N_{IN}$/output rotation speed $N_{OUT}$) as the vehicle speed V decreases or the degree of throttle opening $\theta_{TH}$ increases. In FIG. 6, numerals "1" to "5" indicate the first gear speed (1st) to the fifth gear speed (5th). For a downshift, for example, the 3→2 clutch-to-clutch downshift, the engaging pressure $P_{CO}$ of the clutch C0, which is a disengage-side friction engagement device, is decreased, and simultaneously the engaging pressure $P_{B1}$ of the brake B1, which is an engage-side friction engagement device, is increased. If in this case, the overlap between the engagement of the clutch C0 and the engagement of the brake B1 is small, racing of the engine 10, that is, a temporary sharp rise of the engine rotation speed NE, occurs. If the racing is great, a tie-up, that is, a temporary sharp fall of the output shaft torque $T_{OUT}$, occurs. Therefore, the engaging pressure $P_{CO}$ and/or the engaging pressure $P_{B1}$ is set in accordance with the input torque $T_{IN}$ of the automatic transmission 14 so as to reduce the racing and the tie-up regardless of the input torque. Furthermore, the engaging pressure $P_{CO}$ and/or the engaging pressure $P_{B1}$ is corrected by a feedback control or a learning control so that the racing or the tie-up is less than or equal to a predetermined value.

A moderate throttle opening degree control means 102 restrains the actual degree of throttle opening to a degree that is less than the degree of throttle opening corresponding to a present accelerator operation, that is, the (target) degree of throttle opening determined from the amount of the accelerator operation (accelerator operation amount) Acc in accordance with a pre-set relationship as indicated in FIG. 5, for a predetermined period following the beginning of depression of the accelerator pedal 50, that is, the start of the accelerator operation, in order to prevent an acceleration shock that is likely to occur at the time of a vehicle launching operation (accelerator pedal depressing operation) from a non-operated state of the accelerator pedal 50. In FIGS. 8A, 8B, 8C, 8D, 8E, 8F, 8G, 8H, 8I and 8J, the interval between a time point t1 and a time point t2 corresponds to a state mentioned above. The moderate throttle opening degree control means 102 functions as an engine torque control means as well since the means 102 temporarily decreases the engine output torque for a predetermined period by the throttle opening restraining operation.

An end-of-moderate throttle opening degree control determining means 104 determines whether the moderate throttle opening degree control by the moderate throttle opening degree control means 102 has ended, on the basis of, for example, whether an elapsed time following the depressing operation of the accelerator pedal 50 has exceeded a pre-set time criterion, or whether the actual degree of throttle opening $\theta_{TH}$ has reached the (target) degree of throttle opening determined from the amount of accelerator pedal operation (accelerator operation amount) Acc in accordance with the pre-set relationship indicated in FIG. 5. A downshift judgment determining means 106 determines whether a single automatic downshift judgment has been made by the shift control means 100, for example, whether either one of a 3→2 clutch-to-clutch downshift judgment or a 4→3 downshift judgment has been made. A power-on change determining means 108 determines whether a change has been made from a non-drive run state of the vehicle (engine rotation speed $N_E$≦turbine rotation speed $N_T$) where the accelerator pedal 50 is not depressed (the idle switch is on) to a drive run state of the vehicle (engine rotation speed $N_E$>turbine rotation speed $N_T$) where the accelerator pedal 50 is depressed, on the basis of, for example, a comparison between the engine rotation speed $N_E$ and the turbine rotation speed $N_T$.

If it is determined by the power-on change determining means 108 that the change to the power-on state has been made and it is determined by the downshift judgment determining means 106 that a downshift judgment has been made, that is, if it is determined that a power-on downshift judgment related to the depression of the accelerator pedal 50 has been made, a disengage-side oil pressure control means 110 restrains the reduction of the engaging pressure of the disengage-side friction engagement device until the end-of-moderate throttle opening degree control determining means 104 determines that the moderate throttle opening degree control is ended by the moderate throttle opening degree control means 102. Therefore, it is possible to prevent an event where a sharp rise of the engine speed occurs, which often results in a shock, as the disengage-side friction engagement device slips due to an increased engine output torque $T_E$ caused by the return (increase) of the degree of throttle opening to a normal value at the end of the moderate throttle opening degree control. For example, if the power-on downshift caused in relation to depression of the accelerator pedal 50 is a 3→2 clutch-to-clutch downshift, the reduction of the engaging pressure $P_{CO}$ of the clutch C0 is retarded until it is determined that the moderate throttle opening degree control has ended, as indicated in FIG. 8H.

The disengage-side oil pressure control means 110 restrains or retards the reduction of the engaging pressure, for example, the engaging pressure $P_{CO}$ of the clutch C0, by delaying the start of the reduction of the engaging pressure $P_{CO}$ of the clutch C0, that is, the start of the 3→2 downshift, until it is determined that the moderate throttle opening degree control has ended. When the end-of-control determining means 104 determines that the moderate throttle opening degree control has ended, the disengage-side oil pressure reduction restraining control means 110 temporarily changes an instruction signal that controls the linear solenoid valve SL2 such as to rapidly discharge the operating oil from the clutch C0, and then changes the signal so as to slowly discharge the operating oil from the clutch C0, as indicated by a broken line in FIG. 8G. As mentioned above, the engaging pressure $P_{CO}$ of the clutch C0 is directly controlled by the output pressure of the linear solenoid valve SL2. The linear solenoid valve SL2 is designed so that the magnitude of the engaging pressure $P_{CO}$ of the clutch C0 and the magnitude of the instruction signal that controls the linear solenoid valve SL2 are in an inverse relationship in FIGS. 8G and 8H. In FIG. 8H, a broken line indicates a case where the start of reduction of the engaging pressure $P_{CO}$ of the clutch C0 is delayed until it is determined that the moderate throttle opening degree control has ended, and a solid line indicates a case where such a delay is not performed. In the case of a conventional-art technology indicated by the solid line, the input torque $T_{IN}$ is returned (increased) to a normal value simultaneously with the end of the moderate throttle opening degree control, so that a shock S is caused by a temporary rapid rise F in the engine rotation speed NE or a temporary fluctuation in the output shaft torque $T_{OUT}$ of the automatic transmission 14. However, if the above-described delay of the embodiment is performed, the engine rotation speed NE is smoothly synchronized (time point t3) as indicated by the broken line, and the output shaft torque $T_{OUT}$ of the automatic transmission 14 is also smoothly increased to a value that corresponds to the second gear speed.

Figure 9:
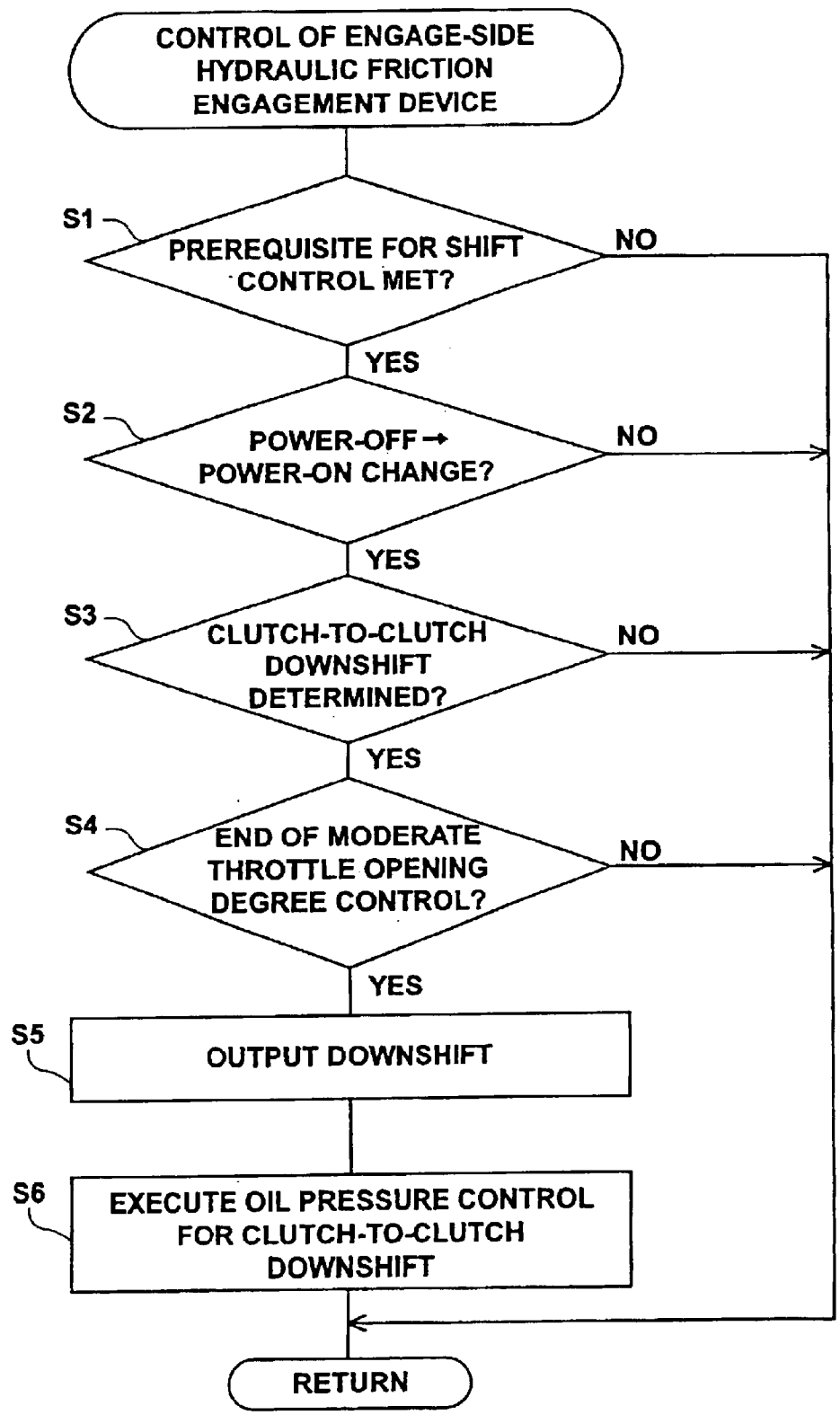
FIG. 9 is a flowchart illustrating a portion of the control operations of the electronic control unit indicated in FIG. 3, that is, a control operation of restraining the reduction of the engaging pressure of a disengage-side friction engagement device at the time of a clutch-to-clutch downshift.

FIG. 9 is a flowchart illustrating a portion of the control operations of the electronic control unit 90, that is, an engaging pressure restraining control of a disengage-side friction engagement device executed at the time of a power-on clutch-to-clutch downshift. Referring to FIG. 9, in step (which will be omitted in the below description) S1, it is determined whether a precondition for a clutch-to-clutch downshift control is met. For example, the precondition includes a condition that the electronic throttle valve 56 be normal, a condition that a rotation sensor, such as the turbine rotation speed sensor 76 for detecting the turbine rotation speed NT, the vehicle speed sensor 66 for detecting the output shaft rotation speed $N_{OUT}$, etc., be normal, a condition that the electromagnetic valves S1 to S5, the linear solenoid valves SL1, SL2, SLU, and the like related to the shift control be normal, a condition that the oil temperature sensor 78 be normal, etc. If any one of the aforementioned devices is not normal, the answer to the determination in S1 becomes negative, and the routine ends. Conversely, if the answer to the determination in S1 is affirmative, it is subsequently determined whether a change has been made from the non-drive run state of the vehicle where the accelerator pedal 50 is not operated to the drive run state of the vehicle where the accelerator pedal 50 is operated, on the basis of, for example, whether the engine rotation speed $N_E$ is greater than the turbine rotation speed $N_T$, in S2, which corresponds to the power-on change determining means 108. If the answer to the determination in S2 is negative, the routine ends. Conversely, if the answer to the determination in S2 is affirmative, it is subsequently determined whether a single and automatic clutch-to-clutch downshift judgment has been made in S3, which corresponds to the downshift judgment determining means 106. If the answer to the determination in S3 is negative, the routine ends. Conversely, if the answer to the determination in S3 is affirmative, it is subsequently determined whether the control of restraining the actual degree of throttle opening to a degree that is less than the (target) degree of throttle opening determined from the amount of accelerator pedal operation (accelerator operation amount) Acc in accordance with the pre-set relationship indicated in FIG. 5 in order to prevent an acceleration shock that is likely to occur at the time of a depressing operation of the accelerator pedal 50 has ended, in S4, which corresponds to the end-of-moderate throttle opening degree control determining means 104. If the answer to the determination in S4 is negative, the routine ends. Conversely, if the answer to the determination in S4 is affirmative, a downshift output, for example, a 3→2 clutch-to-clutch downshift output, is performed in S5, which corresponds to the disengage-side oil pressure control means 110. Subsequently in S6, a normal oil pressure control of the engaging pressure of hydraulic friction engagement devices involved in realization of the downshift, for example, the clutch C0 and the brake B1, is executed.

As described above, according to the embodiment, when it is determined by the downshift judgment means 106 (S3) that a downshift judgment has been made, the reduction of the engaging pressure of the disengage-side friction engagement device is retarded by the disengage-side oil pressure control means 110 (S5) until it is determined by the end-of-control determining means 104 (S4) that the moderate throttle opening degree control has ended. Therefore, insufficient engaging torque of the disengage-side friction engagement device does not occur when the turbine torque $T_T$ (=$T_{IN}$) returns to a normal value at the end of the moderate throttle opening degree control. The takeover of the engaging torque during the clutch-to-clutch downshift is smoothly performed while the turbine torque $T_T$ is stable. Thus, the occurrence of a shock related to the end of the moderate throttle opening degree control is suitably controlled.

Furthermore, according to the embodiment, the disengage-side oil pressure control means 110 (S5) restrains the reduction of the engaging pressure of the disengage-side friction engagement device (clutch C0) by delaying the start of the reduction of the engaging pressure of the disengage-side friction engagement device (clutch C0), that is, the start of the oil pressure control for the clutch-to-clutch downshift. Therefore, even if the input torque TIN is returned (increased) to a normal value at the end of the moderate throttle opening degree control, insufficient engaging torque of the disengage-side friction engagement device does not occur. Thus, occurrence of a shock is suitably prevented.

Still further, according to the embodiment, the engaging pressure $P_{CO}$ of the clutch C0, that is, a disengage-side friction engagement device, is directly controlled by the output pressure of the linear solenoid valve SL2. When it is determined by the end-of-control determining means 104 that the moderate throttle opening degree control has ended, the disengage-side oil pressure control means 110 temporarily changes the instruction signal that controls the linear solenoid valve SL2 such as to rapidly discharge the operating oil from the clutch C0, and then changes the signal so as to slowly discharge the operating oil from the clutch C0. Therefore, the engaging pressure $P_{CO}$ of the clutch C0 controlled directly by the output pressure of the linear solenoid valve SL2 is controlled without a response delay.

Still further, according to the embodiment, the engaging pressure $P_{CO}$ of the clutch C0, which is reduced at the time of a clutch-to-clutch downshift, is set in accordance with the input torque $T_{IN}$ of the automatic transmission 14, and is corrected in accordance with the change in the engine rotation speed $N_E$ or the change in the output shaft torque $T_{OUT}$. Therefore, an appropriate engaging pressure corresponding to the input torque $T_{IN}$ of the automatic transmission 14 can be obtained, and the engaging pressure can be corrected so as to prevent the racing of the engine, that is, a temporary sharp rise of the engine rotation speed $N_E$, and the tie-up, that is, a temporary sharp drop of the output shaft torque $T_{OUT}$.

Further, according to the embodiment, the downshift judgment means 106 (S3), which determines whether a clutch-to-clutch downshift judgment has been made, is a means that determines whether the judgment of a power-on clutch-to-clutch downshift during a vehicle accelerating state where the accelerator pedal 50 is depressed. Therefore, a shock at the time of the power-on clutch-to-clutch downshift is suitably controlled.

Other embodiments of the invention will next be described. With regard to the below-described embodiments, components and portions comparable to those of the foregoing embodiment will be presented with the same reference numerals or characters, and will not be described in detail again.

As indicated by the two-dot line in FIG. 8H, the disengage-side oil pressure control means 110 may be designed so as to restrain the reduction of the engaging pressure $P_{CO}$ of the clutch C0, which is the disengage-side friction engagement device, by holding the engaging pressure $P_{CO}$ of the clutch C0 at a pressure that is lower than a pre-set maximum value (line oil pressure) and that does not start the disengagement of the clutch, until the moderate throttle opening degree control ends. In such an embodiment, the engaging pressure of the disengage-side friction engagement device is restrained by holding the engaging pressure $P_{CO}$ of the clutch C0 at a pressure that is lower than a pre-set maximum value (line oil pressure) and that does not start the disengagement of the clutch until the end-of-moderate throttle opening degree control determining means 104 determines that the moderate throttle opening degree control has ended. Therefore, at the end of the moderate throttle opening degree control, the reduction of the engaging pressure $P_{CO}$ of the clutch C0 is started in such an oil pressure stand-by state. Hence, insufficient engaging torque of the clutch C0 does not occur, and occurrence of a shock is suitably prevented. Furthermore, the responsiveness of the change in the engaging pressure $P_{CO}$ of the clutch C0 following the end of the moderate throttle opening degree control is improved.

While the embodiments of the invention have been described in detail with reference to the drawings, the foregoing embodiments are merely illustrative. That is, the invention may also be carried out with various other modifications and improvements based on the knowledge of those skilled in the art.

For example, although in conjunction with the foregoing embodiments, the 3→2 clutch-to-clutch downshift is described as a downshift, the downshift may be the 4→3 downshift. In this case, the reduction of the engaging pressure $P_{B1}$ of the brake B1, that is, the disengage-side friction engagement device, is restrained until it is determined that the moderate throttle opening degree control has ended.

Furthermore, in the foregoing embodiments, the linear solenoid valve SL2 for directly controlling the engaging pressure $P_{CO}$ of the clutch C0 is designed so that the magnitude of the instruction signal to the linear solenoid valve SL2, and the magnitude of the output pressure thereof, that is, the magnitude of the engaging pressure $P_{CO}$ of the clutch C0, are in an inverse relationship. However, the linear solenoid valve SL2 may be designed so that the magnitude of the instruction signal, and the magnitude of output pressure, that is, the engaging pressure $P_{CO}$ of the clutch C0, have substantially the same changing direction in FIG. 8.

Still further, in the foregoing embodiments, the automatic transmission 14 is an FF vehicle-purposed transverse placement type 5-forward-speed transmission having three planetary gear devices 40, 42, 46. However, the number of planetary gear devices that form the automatic transmission 14 may be other than three. The automatic transmission 14 may also be an FR (front-engine, rear-drive) vehicle-purposed longitudinal placement type transmission.

Although the foregoing embodiments are described in conjunction with, for example, the 3→2 clutch-to-clutch downshift as a downshift, the downshift may be a 2→1 downshift that is accomplished by reducing the engaging pressure of the brake B1, which is a disengage-side friction engagement device. Therefore, a shock related to the end of the moderate throttle opening degree control during the 2→1 downshift will be suitably prevented.

The controllers (e.g., the electronic control units 90) of the illustrated exemplary embodiments are implemented as one or more programmed general purpose computers. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are presently considered to be preferred embodiments thereof, it is to be understood that the invention is not limited to the disclosed embodiments or constructions. To the contrary, the invention is intended to cover various modifications and equivalent arrangements within the spirit and scope of the invention.

What is claimed is:

1. A downshift control apparatus of a vehicular automatic transmission, comprising:

a plurality of friction engagement devices, each of which has two friction members and engages or disengage the two friction members by adjusting an engaging pressure that is generated by supply of an operating oil to the friction engagement device and that engages the two friction members, wherein a downshift is performed by reducing an engaging pressure of a disengage-side one of said friction engagement devices; and a controller which performs a moderate throttle opening degree control of maintaining a degree of throttle opening that is less than a degree of throttle opening that corresponds to an accelerator operation, for a predetermined period following a start of the accelerator operation, and which judges whether the downshift by the friction engagement devices is to be performed, and which determines whether the moderate throttle opening degree control has ended, and which, if it is judged that the downshift is to be performed, restrains a reduction of the engaging pressure of the disengage-side one of the friction engagement devices until it is determined that the moderate throttle opening degree control has ended.

2. The apparatus according to claim 1, wherein if it is judged that the downshift is to be performed, the controller reduces the engaging pressure of the disengage-side friction engagement device to or below a line pressure after the moderate throttle opening degree control has ended.

3. The apparatus according to claim 1, wherein the controller sets the engaging pressure of the disengage-side friction engagement device that is reduced during the downshift in accordance with an input torque of the automatic transmission, and corrects the engaging pressure in accordance with a change in one of an engine rotation speed and an output shaft torque.

4. The apparatus according to claim 1, wherein the controller restrains the reduction of the engaging pressure of the disengage-side friction engagement device by holding the engaging pressure of the disengage-side friction engagement device at a pressure that is lower than a preset maximum value and that does not start a disengagement of the disengage-side friction engagement device.

5. The apparatus according to claim 1, wherein the controller judges whether an accelerator pedal has been depressed, and judges that a downshift by the friction engagement devices is to be performed in a case where the accelerator pedal has been depressed.

6. The apparatus according to claim 1, wherein the downshift is a clutch-to-clutch downshift that is performed by reducing the engaging pressure of the disengage-side friction engagement device and increasing an engaging pressure of an engage-side friction engagement device.

7. The apparatus according to claim 1, wherein the controller judges that the moderate throttle opening degree control has ended, when an elapsed time following a depressing operation of an accelerator pedal exceeds a predetermined time.

8. The apparatus according to claim 1, wherein the controller judges that the moderate throttle opening degree control has ended, if an actual degree of throttle opening reaches the degree of throttle opening that corresponds to the accelerator operation.

9. The apparatus according to claim 1, wherein the controller restrains the reduction of the engaging pressure of the disengage-side friction engagement device by delaying a start of the reduction of the engaging pressure of the disengage-side friction engagement device.

10. The apparatus according to claim 9, wherein the engaging pressure of the disengage-side friction engagement device is directly controlled by an output pressure of a linear solenoid valve, and wherein if it is determined that the moderate throttle opening degree control has ended, the controller temporarily changes a signal that controls the linear solenoid valve such as to rapidly discharge an operating oil from the disengage-side friction engagement device, and then changes the signal so as to slowly discharge the operating oil from the disengage-side friction engagement device.

11. A downshift control method of a vehicular automatic transmission having a plurality of friction engagement devices, each of which has two friction members and engages or disengage the two friction members by adjusting an engaging pressure that is generated by supply of an operating oil to the friction engagement device and that engages the two friction members, wherein a downshift is performed by reducing an engaging pressure of a disengage-side one of said friction engagement devices, the method comprising:

performing a moderate throttle opening degree control of maintaining a degree of throttle opening that is less than a degree of throttle opening that corresponds to an accelerator operation, for a predetermined period following a start of the accelerator operation;

judging whether the downshift by the friction engagement devices is to be performed;

determining whether the moderate throttle opening degree control has ended; and restraining a reduction of the engaging pressure of the disengage-side one of the friction engagement devices until it is determined that the moderate throttle opening degree control has ended, if it is judged that the downshift is to be performed.

12. The method according to claim 11, wherein the reduction of the engaging pressure of the disengage-side friction engagement device is restrained by delaying a start of the reduction of the engaging pressure of the disengage-side friction engagement device.

13. The method according to claim 11, wherein the reduction of the engaging pressure of the disengage-side friction engagement device is restrained by holding the engaging pressure of the disengage-side friction engagement device at a pressure that is lower than a preset maximum value and that does not start a disengagement of the disengage-side friction engagement device.

14. A downshift control apparatus of a vehicular automatic transmission, comprising:

a plurality of friction engagement devices, each of which has two friction members and engages or disengage the two friction members by adjusting an engaging pressure that is generated by supply of an operating oil to the friction engagement device and that engages the two friction members, wherein a downshift is performed by reducing an engaging pressure of a disengage-side one of said friction engagement devices;

means for performing a moderate throttle opening degree control of maintaining a degree of throttle opening that is less than a degree of throttle opening that corresponds to an accelerator operation, for a predetermined period following a start of the accelerator operation, and means for judging whether the downshift by the friction engagement devices is to be performed, and means for determining whether the moderate throttle opening degree control has ended and, if it is judged that the downshift is to be performed, for restraining a reduction of the engaging pressure of the disengage-side one of the friction engagement devices until it is determined that the moderate throttle opening degree control has ended.

* * * * *